No. 724,584. PATENTED APR. 7, 1903.
M. KELLEY.
CHURN.
APPLICATION FILED JUNE 6, 1902.
NO MODEL. 3 SHEETS—SHEET 1.
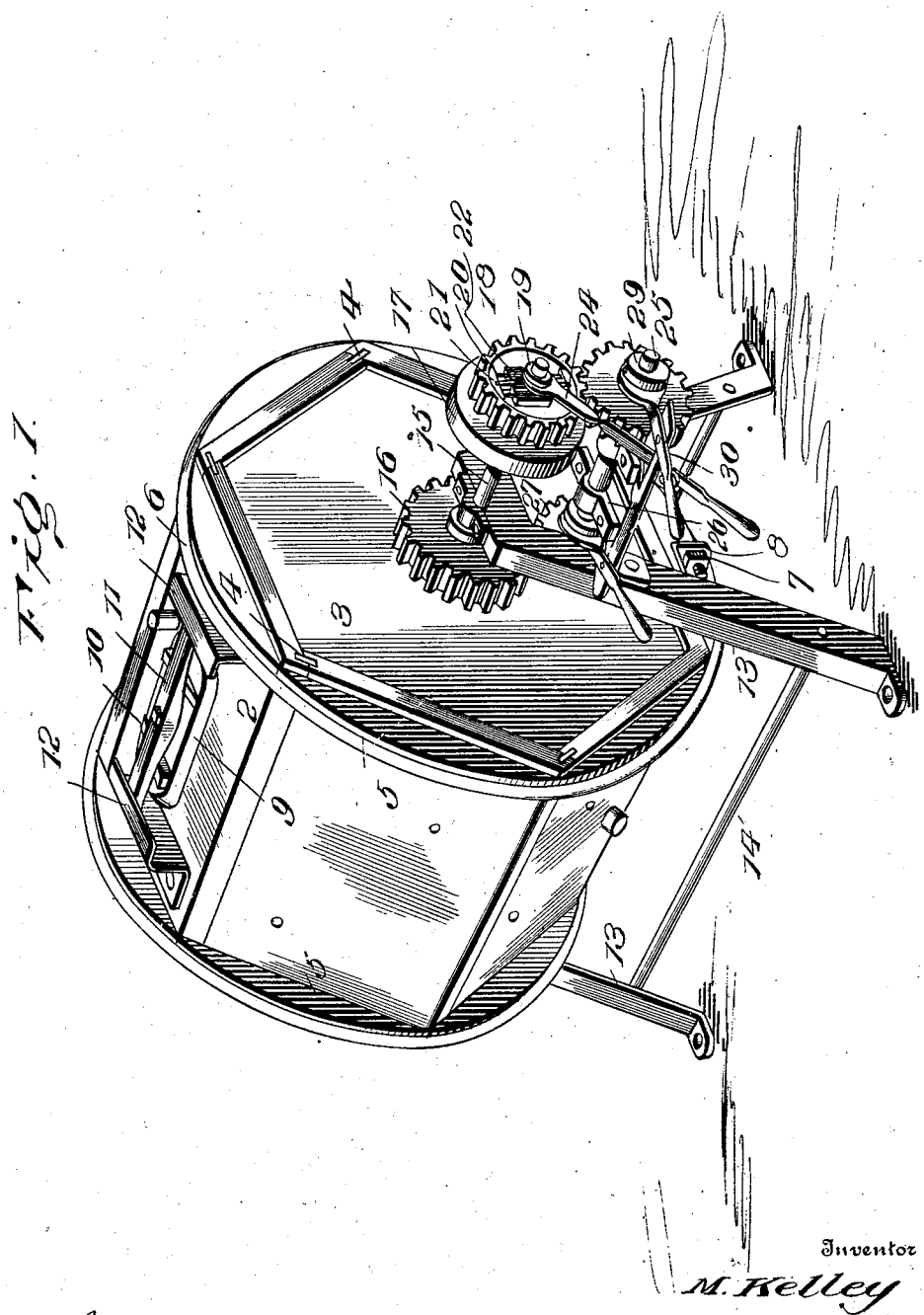
Witnesses
George Watt
Inventor
M. Kelley
By
R. S. & A. B. Lacey
Attorneys No. 724,584. PATENTED APR. 7, 1903.
M. KELLEY.
CHURN.
APPLICATION FILED JUNE 6, 1902.
NO MODEL. 3 SHEETS—SHEET 2.
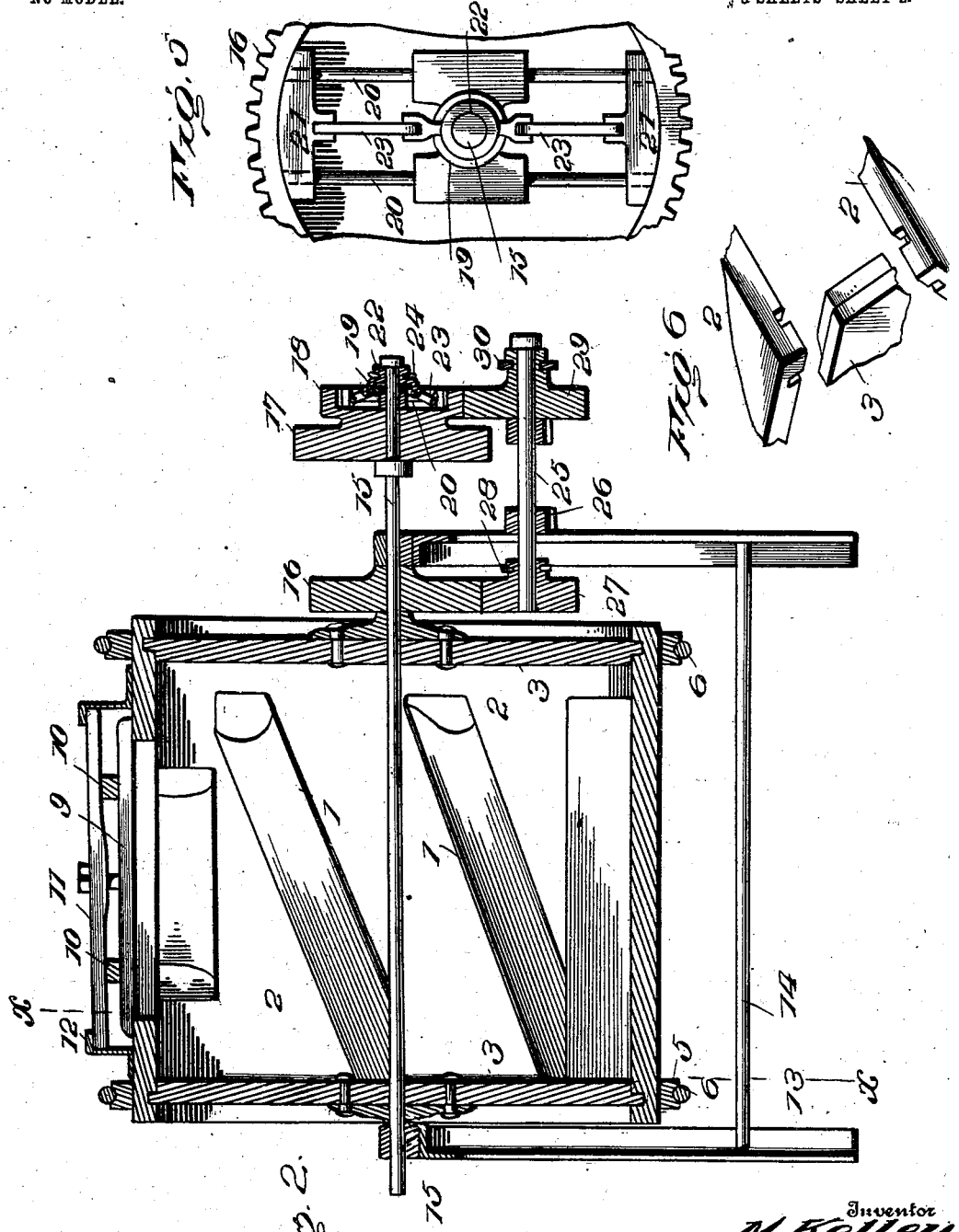

No. 724,584. PATENTED APR. 7, 1903.
M. KELLEY.
CHURN.
APPLICATION FILED JUNE 6, 1902.
NO MODEL. 3 SHEETS—SHEET 3.
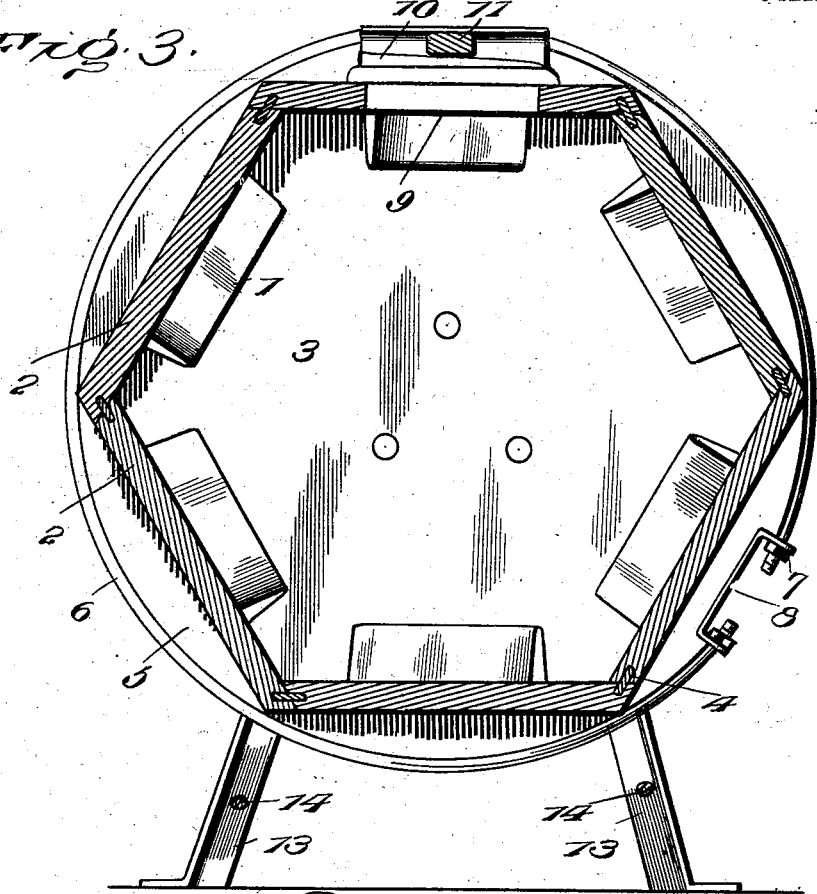
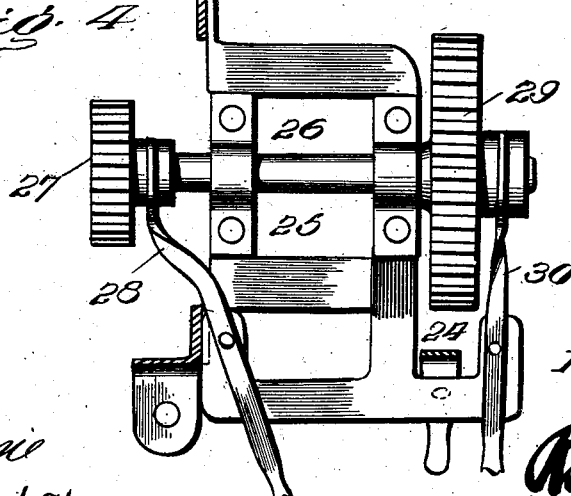
Witnesses
Inventor
M. Kelley

UNITED STATES PATENT OFFICE.

MANLEY KELLEY, OF COLO, IOWA.

CHURN.

SPECIFICATION forming part of Letters Patent No. 724,584, dated April 7, 1903.

Application filed June 6, 1902. Serial No. 110,513. (No model.)

*To all whom it may concern:*

Be it known that I, MANLEY KELLEY, a citizen of the United States, residing at Colo, in the county of Story and State of Iowa, have invented certain new and useful Improvements in Churns, of which the following is a specification.

This invention combines in a single machine of novel formation means for churning butter and subsequently working the same for the removal of milk and the incorporation of salt, the churn-body being of novel formation and the operating-gearing of peculiar construction, so as to admit of operating the churn at different speeds according to the particular work to be performed.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a churn embodying the invention. Fig. 2 is a vertical central longitudinal section thereof. Fig. 3 is a transverse section about on the line X X of Fig. 2. Fig. 4 is a detail view of the operating-gearing on a larger scale. Fig. 5 is a detail view of the clutch. Fig. 6 is a detail view of a portion of one of the heads and the corner portions of adjacent sides, the parts being separated and arranged about in the position which they will occupy when assembled.

Corresponding and like parts are referred to in the following description and indicated in all the views of the drawings by the same reference characters.

The churn-body is polygonal in form and may comprise any number of sides, depending upon its capacity, and is rotatably mounted. Blades or wings 1 extend inward from the sides 2 of the body and incline with reference to the axis and are spaced at one end from the proximal head of the churn-body. By having the blades or wings 1 inclined throughout their length the butter is carried upward and permitted to drop, while at the same time being moved from one end of the churn toward the opposite end, thereby insuring the bringing of every portion into position for treatment. These blades or wings are of especial advantage in working the butter, as they obviate the breaking of the grain, which is the chief objection urged against butter-working machines generally used. Heads 3 are of like formation and correspond to the polygonal form of the churn-body in transverse section, and the sides 2 are attached to corresponding edges of the heads and overlap at their edges, which are correspondingly grooved to receive keys or locking-strips 4, by means of which tight joints are provided. The sides 2 have transverse grooves in their inner faces and near their ends to receive the heads which are let therein. Segments 5 are fitted to the end portions of the sides 2 about in the plane of the heads 3 and are grooved in their outer edges to receive circular ties 6, by means of which the parts are securely joined, the end portions of the ties being threaded to receive nuts 7 after being passed through openings in the bent ends of coupling-lugs 8, seated in one of the segments. Access is had to the interior of the churn-body through an opening in one of the sides 2, which is closed by means of a cover 9, provided near its ends with oppositely-disposed cams or inclined surfaces 10 for coöperation with a bar 11, pivoted intermediate at its ends to the cover 9 and adapted to engage under cleats 12, provided upon the side having the opening at the ends of the latter, said cover being forced into place by the cams or inclined surfaces 10, as will be readily comprehended.

The frame for supporting the churn and its operating-gearing may be of any construction and, as shown, comprises standards 13 and longitudinal tie rods or bars 14. Bearings are provided at the upper ends of the standards 13 and receive journals 15, projected from the heads of the churn-body. One of the journals 15 is extended and receives elements of the operating-gearing, as will appear more fully hereinafter. A gear-wheel 16 is secured to the extended journal 15, so as to rotate therewith, and a band-pulley 17 is loosely mounted upon the extended end of said journal and is provided upon one side with cog-gearing 18, formed upon the outer surface of a laterally-extended rim, the inner surface of said rim being smooth and forming one element of a clutch of the friction type. A guide is secured to the journal carrying the band-pulley and comprises a hub 19 and oppositely-extended pins 20. Shoes 21 are slidably mounted upon the end portions of the guide and constitute the gripping elements of the clutch and are adapted to coöperate with the aforementioned annular clutch member. A collar 22 is slidably mounted upon the outer end of the extended journal and links 23, connected with the shoes 21. A shipper-lever 24 has its forked end extended into the annular groove of the collar 22 and is adapted to throw the clutch into and out of operation. When the lever 24 is operated to move the collar 22 outward, the clutch is unshipped and the band-pulley is adapted to run freely upon the journal; but when the collar 22 is moved inward the clutch is thrown into active operation and the band-pulley 17 and its journal rotate together and cause the churn-body to correspondingly move to effect a churning of the butter.

For operating the churn at a slower speed the following instrumentalities have been devised, and consist of the shaft 25, arranged parallel with the extended journal 15 and mounted in bearings applied to a bracket extension 26, forming a part of the framework and attached to the standard supporting the extended journal. The shipper-lever 24 is fulcrumed to the bracket extension 26. A gear-wheel 27 is mounted upon the inner end of the shaft 25, so as to turn therewith and slide thereon, a shipper-lever 28 being provided for moving the gear-wheel 27 upon the shaft so as to throw it into and out of meshing relation with the gear-wheel 16. Another gear-wheel, 29, is mounted upon the outer end of the shaft 25 to turn therewith and slide thereon and is operated by means of a shipper-lever 30, which, with the shipper-lever 28, is fulcrumed to the bracket extension 26. The gear-wheel 29 is adapted to be thrown into and out of gear with the cog-gearing 18. When the gear-wheel 27 is in mesh with the gear-wheel 16, the gear-wheel 29 is in mesh with the cog-gearing 18 and the clutch is unshipped. Hence the churn-body is rotated through the intervention of the shaft 25 and the coöperating gearing. The diameters of the gear elements 16, 18, 27, and 29 are such as to admit of driving the churn at a slower speed than if operated directly from the band-pulley when clutched to its supporting-journal. For working the butter it is preferred to operate the churn more slowly than for churning. Hence the provision of the slow gearing.

This churn is readily accessible for cleaning, every part being within reach of a brush, so as to be scrubbed, thereby insuring perfect cleanliness, which is absolutely necessary in machines of this character to avoid contamination of the product.

Having thus described the invention, what is claimed as new is—

In a churn, a polygonal churn-body, segments applied against the outer sides of the churn-body and unitedly forming a circle, a circular tie encompassing the churn-body and segments, and means for drawing the ends of said tie together, substantially as specified.

In testimony whereof I affix my signature in presence of two witnesses.

MANLEY KELLEY. [L. S.]

Witnesses:
 J. A. FITCHPATRICK,
 C. B. WHITE.